(12) United States Patent
Bian

(10) Patent No.: US 12,546,938 B2
(45) Date of Patent: Feb. 10, 2026

(54) PHOTODETECTORS INTEGRATED WITH A SEGMENTED COUPLING-ASSISTANCE FEATURE

(71) Applicant: GlobalFoundries U.S. Inc., Malta, NY (US)

(72) Inventor: Yusheng Bian, Ballston Lake, NY (US)

(73) Assignee: GlobalFoundries U.S. Inc., Malta, NY (US)

( * ) Notice: Subject to any disclaimer, the term of this patent is extended or adjusted under 35 U.S.C. 154(b) by 327 days.

(21) Appl. No.: 18/196,796

(22) Filed: May 12, 2023

(65) Prior Publication Data

US 2024/0377583 A1 Nov. 14, 2024

(51) Int. Cl.
G02B 6/122 (2006.01)
G02B 6/13 (2006.01)

(52) U.S. Cl.
CPC ............ *G02B 6/1228* (2013.01); *G02B 6/13* (2013.01)

(58) Field of Classification Search
CPC ................................ G02B 6/1228; G02B 6/13
See application file for complete search history.

(56) References Cited

U.S. PATENT DOCUMENTS

| | | |
|---|---|---|
| 7,095,920 B1 | 8/2006 | Little |
| 7,616,904 B1 | 11/2009 | Gunn, III et al. |
| 9,557,484 B1 | 1/2017 | Norberg et al. |
| 10,191,214 B2 | 1/2019 | Dong |
| 10,444,433 B1 | 10/2019 | Bian et al. |
| 10,585,245 B1 | 3/2020 | Bian et al. |
| 10,818,807 B2 | 10/2020 | Jacob et al. |
| 10,910,503 B1 | 2/2021 | Bian et al. |
| 11,531,164 B2 | 12/2022 | Dezfulian et al. |
| 2012/0063484 A1* | 3/2012 | Goddard ............... G02B 6/124 264/293 |
| 2018/0120504 A1 | 5/2018 | Qi et al. |

OTHER PUBLICATIONS

Wang, Z., Xu, X., Fan, D. et al. "Geometrical tuning art for entirely subwavelength grating waveguide based integrated photonics circuits." Sci Rep 6, 24106 (2016). https://doi.org/10.1038/srep24106.
Xiao Hu et al., "High-speed and high-power germanium photodetector with a lateral silicon nitride waveguide," Photon. Res. 9, 749-756 (2021).

(Continued)

*Primary Examiner* — Michael P Mooney
(74) *Attorney, Agent, or Firm* — Thompson Hine LLP; Anthony Canale

(57) ABSTRACT

Structures including a photodetector and methods of forming a structure including a photodetector. The structure comprises a photodetector including a pad and a semiconductor layer on the pad, a first waveguide core including a tapered section adjacent to a sidewall of the semiconductor layer, and a second waveguide core including a curved section adjacent to the sidewall of the semiconductor layer. The curved section includes a plurality of segments, and the tapered section of the first waveguide core is overlapped by at least one of the plurality of segments in the curved section of the second waveguide core.

20 Claims, 12 Drawing Sheets

(56) References Cited

OTHER PUBLICATIONS

H. Chen, et al., "−1 V bias 67 GHz bandwidth Si-contacted germanium waveguide p-i-n photodetector for optical links at 56 Gbps and beyond," Optics Express; vol. 24, No. 5; pp. 4622-4631 (Mar. 7, 2016).

Liao S. et al., "36 GHz submicron silicon waveguide germanium photodetector." Optics Express. May 23, 2011;19(11):10967-72. doi: 10.1364/OE.19.010967. PMID: 21643357.

Feng NN et al., "Vertical p-i-n germanium photodetector with high external responsivity integrated with large core Si waveguides." Optics Express. Jan. 4, 2010;18(1):96-101. doi: 10.1364/OE.18.000096. PMID: 20173827.

S. Rauch, D. Lee, A. Vert, L. Jiang and B. Min, "Reliability Failure Modes of an Integrated Ge Photodiode for Si Photonics," 2020 Optical Fiber Communications Conference and Exhibition (OFC), San Diego, CA, USA, 2020, pp. 1-3.

Martinez NJ et al., "High performance waveguide-coupled Ge-on-Si linear mode avalanche photodiodes." Optics Express. Aug. 22, 2016;24(17):19072-81. doi: 10.1364/OE.24.019072. PMID: 27557187.

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

M. Rakowski et al, "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group, 2020), paper T3H.3.

Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group, 2020), paper FW5D.2.

Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper M5A.2.

Y. Bian et al., "3D Integrated Laser Attach Technology on 300-mm Monolithic Silicon Photonics Platform," 2020 IEEE Photonics Conference (IPC), 2020, pp. 1-2, doi: 10.1109/IPC47351.2020.9252280.

B. Peng et al., "A CMOS Compatible Monolithic Fiber Attach Solution with Reliable Performance and Self-alignment," in Optical Fiber Communication Conference (OFC) 2020, OSA Technical Digest (Optica Publishing Group, 2020), paper Th3I.4.

Y. Bian et al., "Monolithically integrated silicon nitride platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper Th1A.46.

A. Aboketaf et al., "Towards fully automated testing and characterization for photonic compact modeling on 300-mm wafer platform," in Optical Fiber Communication Conference (OFC) 2021, P. Dong, J. Kani, C. Xie, R. Casellas, C. Cole, and M. Li, eds., OSA Technical Digest (Optica Publishing Group, 2021), paper W6A.1.

A. Chowdhury et al., "High Performance Avalanche Photodiode in a Monolithic Silicon Photonics Technology," 2022 Optical Fiber Communications Conference and Exhibition (OFC), San Diego, CA, USA, 2022, pp. 1-3.

W. S. Lee et al., "Automatic Waveguide Balancing Using Point Set Operations," 2022 Optical Fiber Communications Conference and Exhibition (OFC), San Diego, CA, USA, 2022, pp. 1-3.

S. Assefa et al., "CMOS-integrated 40GHz germanium waveguide photodetector for on-chip optical interconnects," 2009 Conference on Optical Fiber Communication, 2009, pp. 1-3, doi: 10.1364/OFC.2009.OMR4 (2009).

Donghwan Ahn et al., "High performance, waveguide integrated Ge photodetectors," Optics Express, vol. 15, No. 7, pp. 3916-3921 (2007).

Kyle Preston et al., "Waveguide-integrated telecom-wavelength photodiode in deposited silicon," Optics Letters, vol. 36, No. 1, pp. 52-54 (Jan. 1, 2011).

Qian Li et al.; "Polarization-Insensitive Waveguide Schottky Photodetectors Based on Mode Hybridization Effects in Asymmetric Plasmonic Waveguides," Sensors 2020, vol. 20, Issue 23, 6885; doi:10.3390/s20236885; pp. 1-17 (2020).

Jurgen Michel et al.; "High-performance Ge-on-Si photodetectors," Nature Photonics, Focus Review Articles; DOI:10.1038/NPhoton.2010.157; vol. 4; pp. 527-534 (Aug. 2010).

Aboketaf, Abdelsalam et al., "Multi-Mode Optical Waveguide Structures With Isolated Absorbers" filed Nov. 2, 2020 as a U.S. Appl. No. 17/087,182.

Bian, Yusheng et al., "Photodetectors Integrated With an Inverse Taper Including a Curved Tip" filed Dec. 15, 2021 as a U.S. Appl. No. 17/551,544.

U.S. Patent and Trademark Office, Notice of Allowance issued in U.S. Appl. No. 17/551,544 on Mar. 23, 2023, 8 pages.

European Patent Office, Extended European Search Report and Opinion issued in European Patent Application No. 23207846.9 on May 3, 2024; 12 pages.

Junjia Wang, Ivan Glesk, and Lawrence R. Chen, "Subwavelength grating filtering devices," Optics Express, vol. 22, Issue 13, 15335-15345 (2014).

European Patent Office, Extended European Search Report and Opinion issued in European Patent Application No. 23207846.9 on Sep. 17, 2025; 13 pages.

\* cited by examiner

US 12,546,938 B2

PHOTODETECTORS INTEGRATED WITH A SEGMENTED COUPLING-ASSISTANCE FEATURE

BACKGROUND

The disclosure relates to semiconductor device fabrication and integrated circuits and, more specifically, to structures including a photodetector and methods of forming a structure including a photodetector.

Photonics chips are used in many applications and systems including, but not limited to, data communication systems and data computation systems. A photonics chip includes a photonic integrated circuit comprised of optical components, such as modulators, polarizers, and optical couplers, that are used to manipulate light received from a light source, such as a laser or an optical fiber.

Photonics chips may include photodetectors that convert light, which may be modulated as an optical signal, into an electrical signal. A photodetector may suffer from mode mismatch and significant back reflection due to a refractive index mismatch between the light-absorbing material of the photodetector and the material of a waveguide core supplying the light to the light-absorbing material. The mode mismatch and back reflection degrade the coupling efficiency for light to the photodetector. In particular, the coupling efficiency for transverse-magnetic polarized light may be lower than the coupling efficiency for transverse-electric polarized light.

Improved structures including a photodetector and methods of forming a structure including a photodetector are needed.

SUMMARY

In an embodiment of the invention, a structure comprises a photodetector including a pad and a semiconductor layer on the pad, a first waveguide core including a tapered section adjacent to a sidewall of the semiconductor layer, and a second waveguide core including a curved section adjacent to the sidewall of the semiconductor layer. The curved section includes a plurality of segments, and the tapered section of the first waveguide core is overlapped by at least one of the plurality of segments in the curved section of the second waveguide core.

In an embodiment of the invention, a structure comprises a first waveguide core, a second waveguide core adjacent to the first waveguide core, and a ring resonator including a plurality of segments. At least one of the segments is overlapped with a portion of the first waveguide core, and at least one of the segments is overlapped with a portion of the second waveguide core.

In an embodiment of the invention, a method comprises forming a photodetector including a pad and a semiconductor layer on the pad, forming a first waveguide core including a tapered section adjacent to a sidewall of the semiconductor layer, and forming a second waveguide core including a curved section adjacent to the sidewall of the semiconductor layer. The curved section includes a plurality of segments, and the tapered section of the first waveguide core is overlapped by at least one of the plurality of segments in the curved section of the second waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
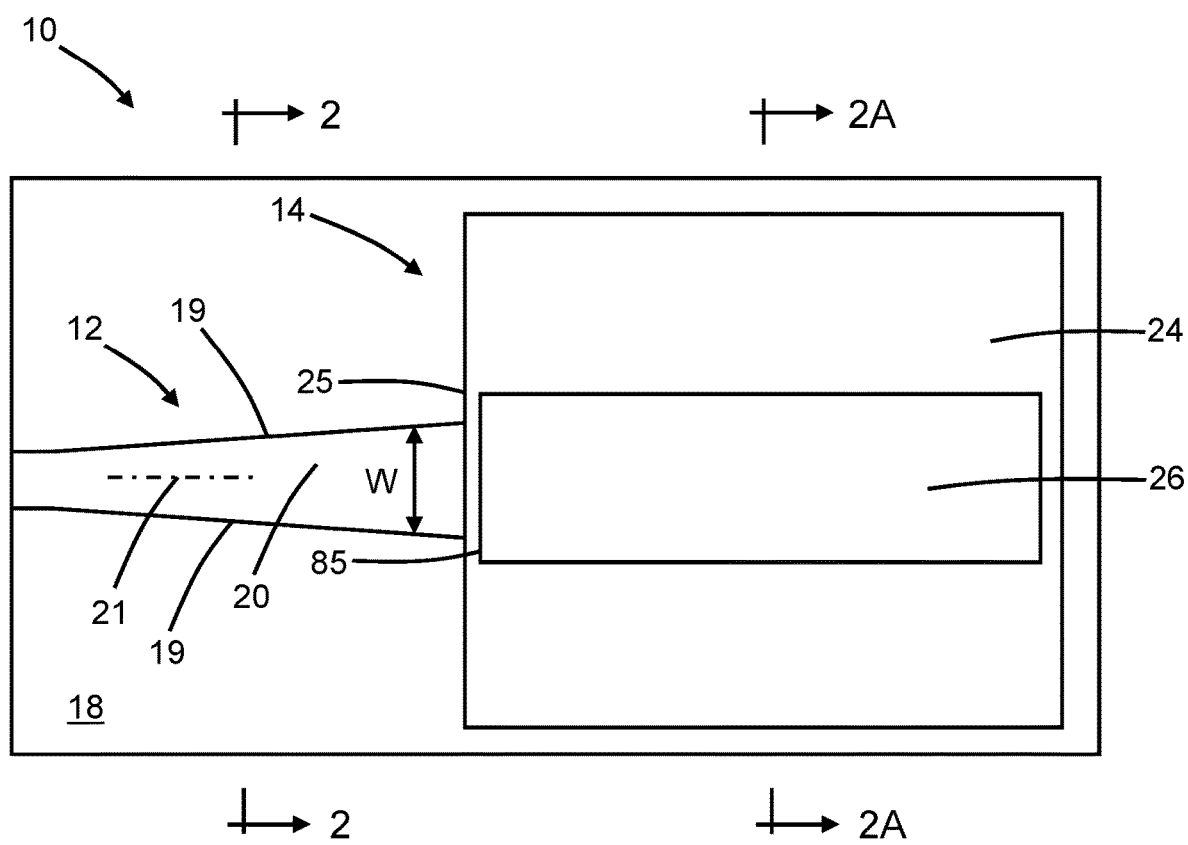
FIG. 1 is a top view of a structure at an initial fabrication stage of a processing method in accordance with embodiments of the invention.
Figure 2:
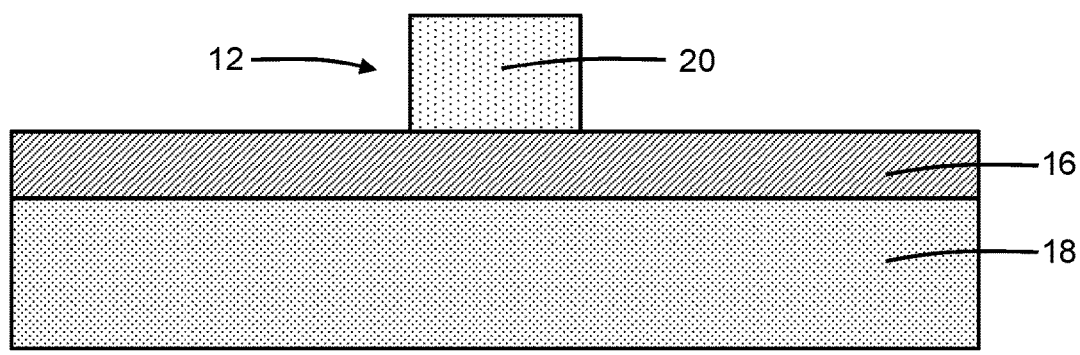
FIG. 2 is a cross-sectional view taken generally along line 2-2 in FIG. 1.
Figure 2A:
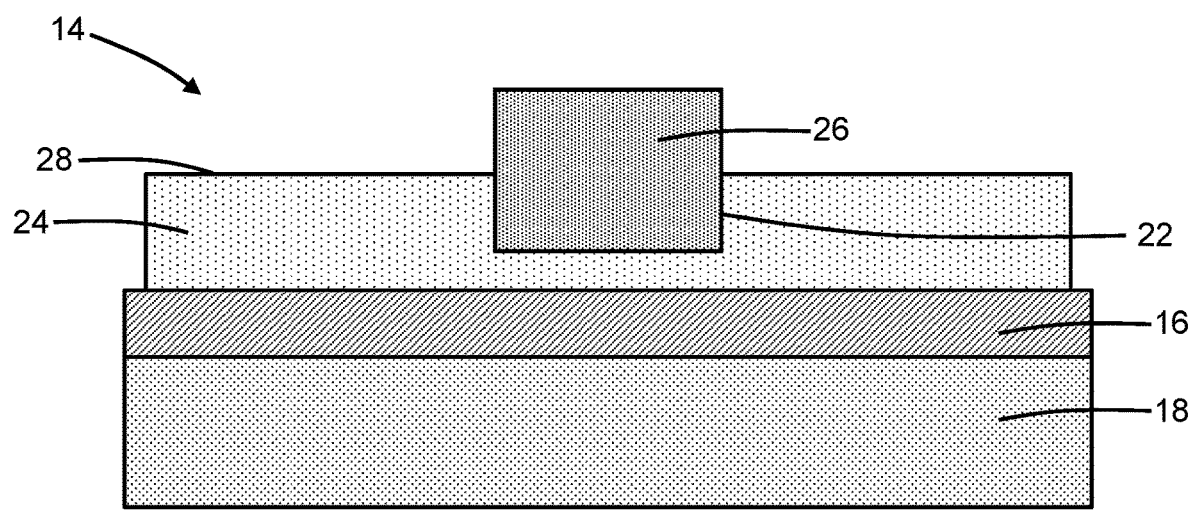
FIG. 2A is a cross-sectional view taken generally along line 2A-2A in FIG. 1.

With reference to FIGS. 1, 2, 2A and in accordance with embodiments of the invention, a structure 10 includes a waveguide core 12 and a photodetector 14 that are positioned on, and above, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be a buried oxide layer of a silicon-on-insulator substrate, and the dielectric layer 16 may separate the waveguide core 12 and the photodetector 14 from the semiconductor substrate 18.

The waveguide core 12 includes a tapered section 20 that is positioned adjacent to the photodetector 14. The tapered section 20 of the waveguide core 12 has opposite sidewalls 19, and the tapered section 20 may extend along a longitudinal axis 21. The photodetector 14 includes a pad 24 having a side edge 25 and a semiconductor layer 26 that is integrated into the pad 24. The tapered section 20 may terminate at the side edge 25 of the pad 24 inasmuch as the sidewalls 19 intersect the side edge 25. The semiconductor layer 26 may have a sidewall 85 that is positioned adjacent to the side edge 25 of the pad 24. The tapered section 20 of the waveguide core 12 is also positioned adjacent to the sidewall 85 of the semiconductor layer 26. In an embodiment, the side edge 25 of the pad 24 may be positioned between the tapered section 20 and the sidewall 85 of the semiconductor layer 26.

The tapered section 20 may have a width dimension W that increases with decreasing distance along the longitudinal axis 21 from the side edge 25. In an embodiment, the width dimension W of the tapered section 20 may increase linearly with decreasing distance from the side edge 25. In an alternative embodiment, the width dimension W of the tapered section 20 may vary based on a non-linear function, such as a quadratic function, a cubic function, a parabolic function, a sine function, a cosine function, a Bezier function, or an exponential function. In an embodiment, the tapered section 20 may include a single stage of tapering characterized by a taper angle. In an alternative embodiment, the tapered section 20 may taper in multiple stages each characterized by a different taper angle.

In an alternative embodiment, the longitudinal axis 21 of the tapered section 20 may be angled to reduce optical return loss from the side edge 25 of the pad 24 and the sidewall 85 of the semiconductor layer 26. In an alternative embodiment, the tapered section 20 of the waveguide core 12 may be tapered in the height dimension as well as tapered in the width dimension W. For example, the height dimension of the tapered section 20 may increase with decreasing distance from the side edge 25 of the pad 24. In an alternative embodiment, the semiconductor substrate 18 may include a cavity or undercut beneath all or part of the tapered section 20 of the waveguide core 12.

In an embodiment, the waveguide core 12 and the pad 24 of the photodetector 14 may be comprised of a material having a refractive index that is greater than the refractive index of silicon dioxide. In an embodiment, the waveguide core 12 and the pad 24 of the photodetector 14 may be comprised of a semiconductor material. In an embodiment, the waveguide core 12 and the pad 24 of the photodetector 14 may be comprised of single-crystal silicon. The waveguide core 12 and the pad 24 of the photodetector 14 may be formed by patterning a layer comprised of their constituent material with lithography and etching processes. In an embodiment, the waveguide core 12 and the pad 24 of the photodetector 14 may be formed by patterning the semiconductor material (e.g., single-crystal silicon) of a device layer of a silicon-on-insulator substrate.

The semiconductor layer 26 may be comprised of a light-absorbing material that generates charge carriers from absorbed light by the photoelectric effect. In an embodiment, the semiconductor layer 26 may be comprised of a material having a composition that includes germanium. In an embodiment, the semiconductor layer 26 may be comprised of intrinsic germanium. The semiconductor layer 26 may be formed by an epitaxial growth process. In an embodiment, the semiconductor layer 26 may be epitaxially grown inside a trench 22 that is patterned in the pad 24 such that the semiconductor layer 26 includes a portion arranged below the top surface 28 of the pad 24 and a portion that projects above the top surface 28 of the pad 24. In an alternative embodiment, the semiconductor layer 26 may be epitaxially grown on the top surface 28 of the pad 24 and fully above the top surface 28. One or more conformal dielectric layers (not shown) may be formed that extend across the semiconductor layer 26.

In an alternative embodiment, semiconductor layer 26 may be replaced by an electro-absorption modulator that relies on the Quantum-Confined Stark Effect (QCSE) for operation. For example, the electro-absorption modulator may include a multi-quantum-well region having layers that are comprised of silicon germanium.

Figure 3:
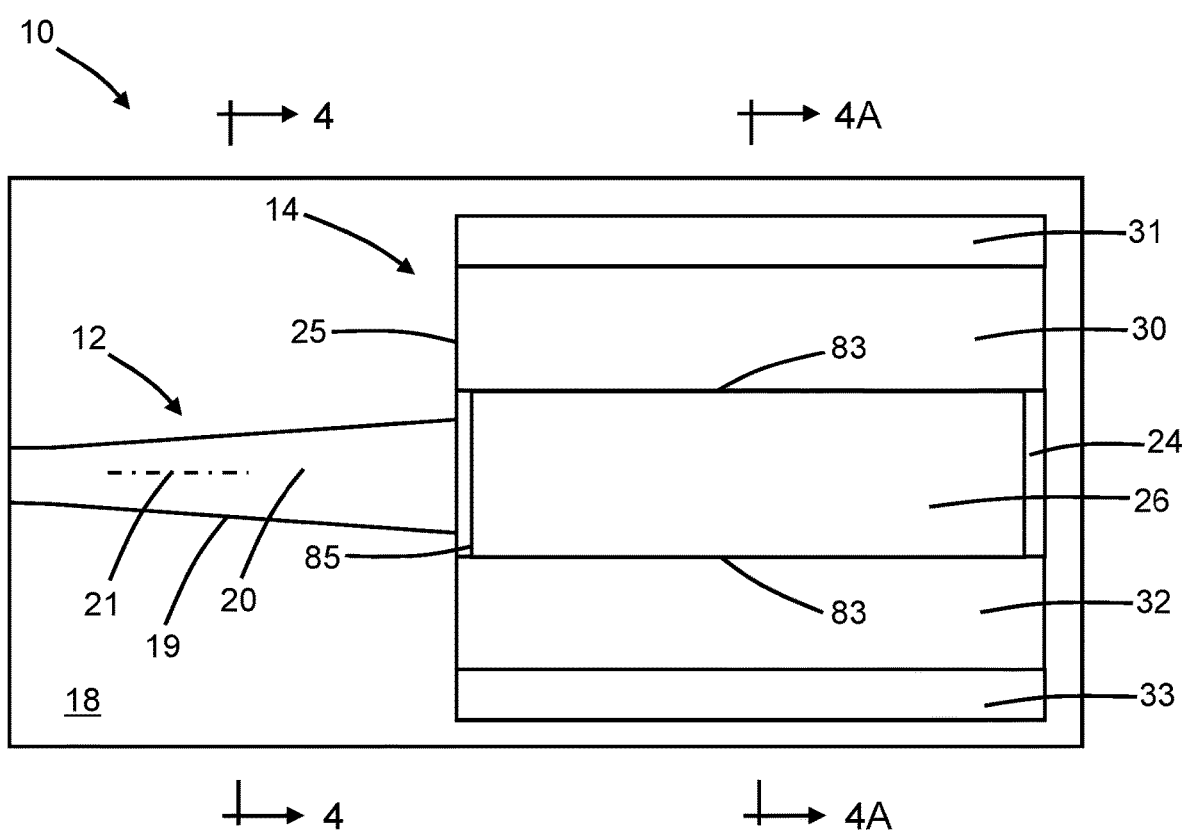
FIG. 3 is a top view of the structure at a fabrication stage subsequent to FIG. 1.
Figure 4:
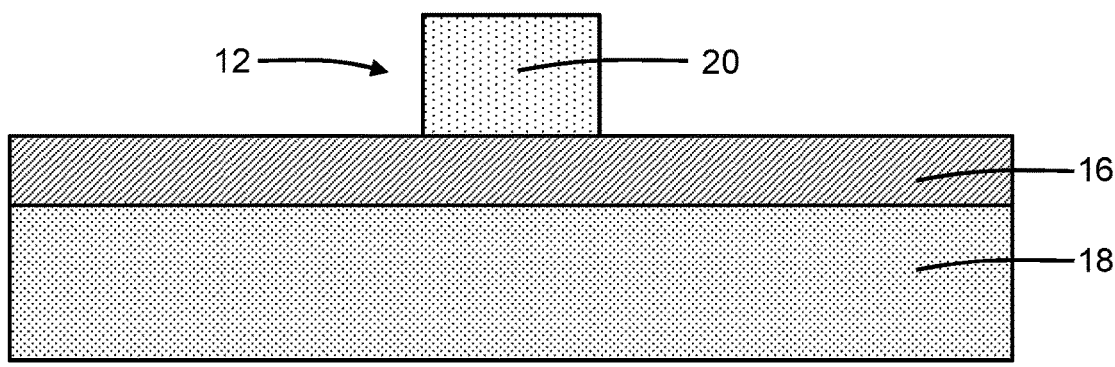
FIG. 4 is a cross-sectional view taken generally along line 4-4 in FIG. 3.
Figure 4A:
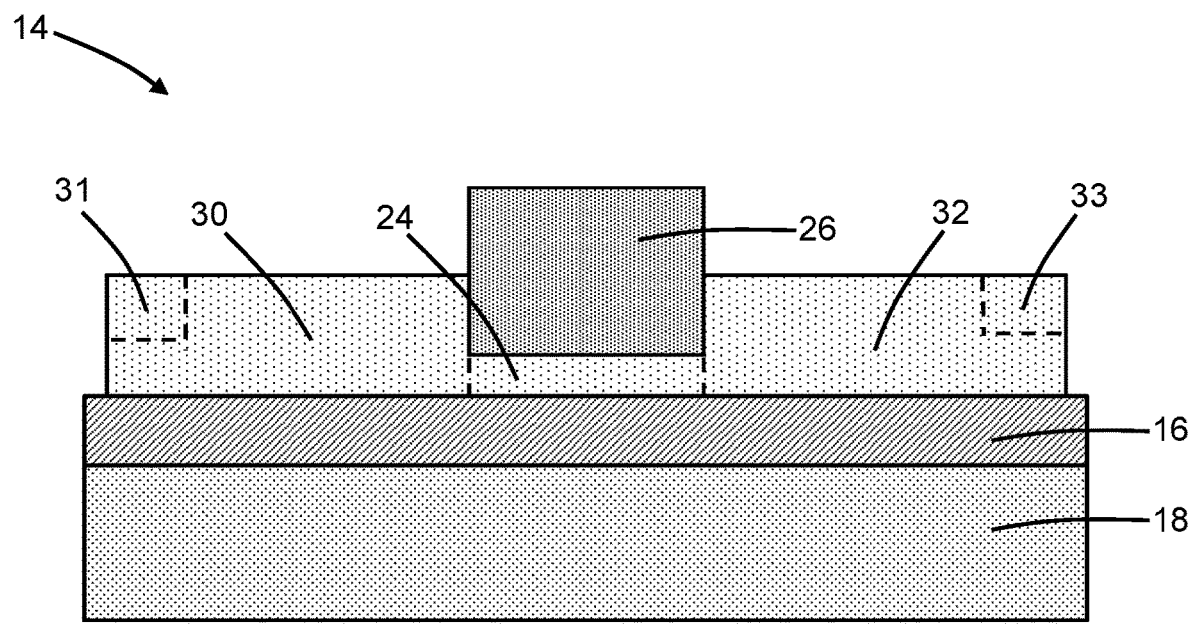
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, the structure 10 may include a doped region 30 and a doped region 32 that are formed in respective portions of the pad 24. The doped regions 30, 32, which differ in conductivity type, may extend through the entire thickness of the pad 24 to the underlying dielectric layer 16. The semiconductor layer 26 is laterally positioned on the pad 24 between the doped region 30 and the doped region 32. The doped region 30 and the doped region 32 may be arranged adjacent to opposite sidewalls 83 of the semiconductor layer 26 to respectively define an anode and a cathode of the photodetector 14.

The doped region 30 may be formed by, for example, ion implantation with an implantation mask having an opening that determines the implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions (e.g., ion species, dose, kinetic energy) may be selected to tune the electrical and physical characteristics of the doped region 30. The implantation mask may be stripped after forming the doped region 30. In an embodiment, the semiconductor material of the doped region 30 may contain a p-type dopant (e.g., boron) that provides p-type electrical conductivity. In an embodiment, a portion of the semiconductor layer 26 immediately adjacent to the doped region 30 and an underlying portion of the pad 24 may be implanted with the p-type dopant due to overlap of the implantation mask.

The doped region 32 may be formed by, for example, ion implantation with an implantation mask with an opening that determines an implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions (e.g., ion species, dose, kinetic energy) may be selected to tune the electrical and physical characteristics of the doped region 32. The implantation mask may be stripped after forming the doped region 32. In an embodiment, the semiconductor material of the doped region 32 may contain an n-type dopant (e.g., phosphorus and/or arsenic) that provides n-type electrical conductivity. In an embodiment, a portion of the semiconductor layer 26 immediately adjacent to the doped region 32 and an underlying portion of the pad 24 may be implanted with the n-type dopant due to overlap of the implantation mask.

A portion of the pad 24 beneath the semiconductor layer 26 may be comprised of intrinsic semiconductor material (e.g., intrinsic silicon) that is not doped by the ion implantation forming the doped regions 30, 32. The longitudinal axis 21 of the tapered section 20 may be aligned with the intrinsic portion of the pad 24. The doped region 30, the intrinsic semiconductor materials of the semiconductor layer 26 and the portion of the pad 24 beneath the semiconductor layer 26, and the doped region 32 may define a lateral p-i-n diode structure that is integrated into the photodetector 14.

A heavily-doped region 31 may be formed by a masked ion implantation in a portion of the doped region 30, and a heavily-doped region 33 may be formed by a masked ion implantation in a portion of the doped region 32. The heavily-doped regions 31, 33 are spaced outwardly from the opposite sidewalls 83 of the semiconductor layer 26. The heavily-doped region 31 may be doped to the same conductivity type as the doped region 30 but at a higher dopant concentration. The heavily-doped region 33 may be doped to the same conductivity type as the doped region 32 but at a higher dopant concentration.

In an alternative embodiment, the photodetector 14 may have a vertical arrangement instead of a lateral arrangement. Specifically, in the vertical arrangement, the doped region 30 may be arranged below the semiconductor layer 26, and the doped region 32 may be arranged above the semiconductor layer 26. In an alternative embodiment, the doped regions 30, 32 and the heavily-doped regions 31, 33 may be omitted, and the photodetector 14 may be characterized as an absorber in which the semiconductor layer 26 merely absorbs light and the resulting photons are not collected to generate a photocurrent.

Figure 5:
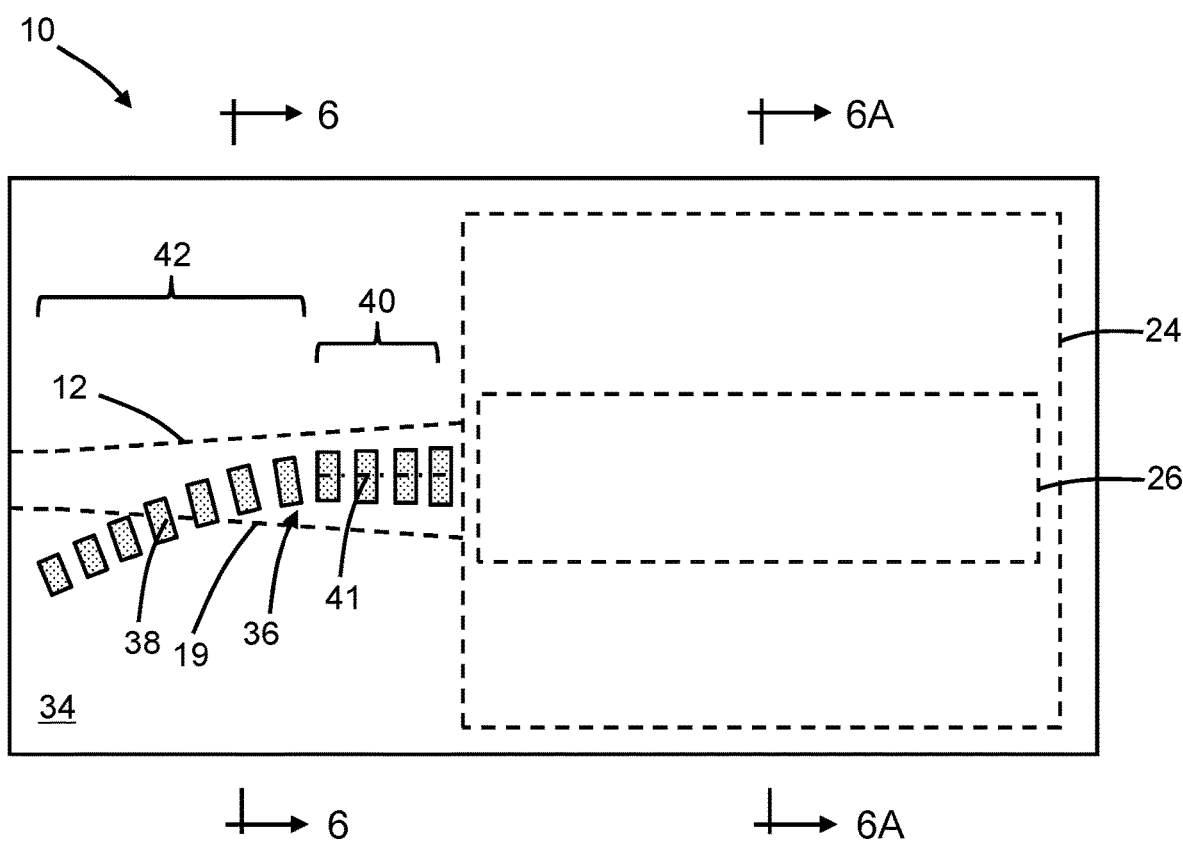
FIG. 5 is a top view of the structure at a fabrication stage subsequent to FIG. 3.
Figure 6:
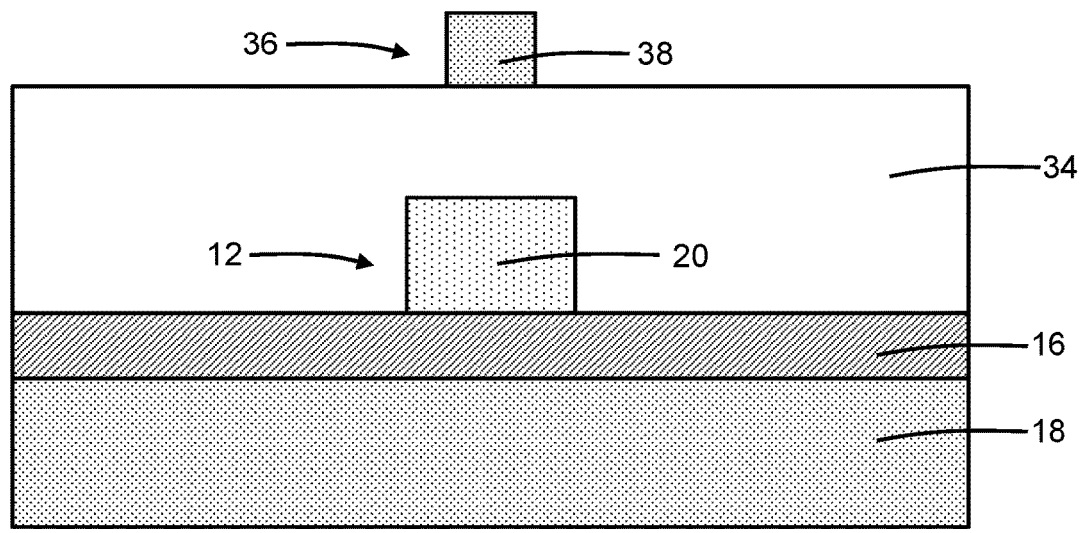
FIG. 6 is a cross-sectional view taken generally along line 6-6 in FIG. 5.
Figure 6A:
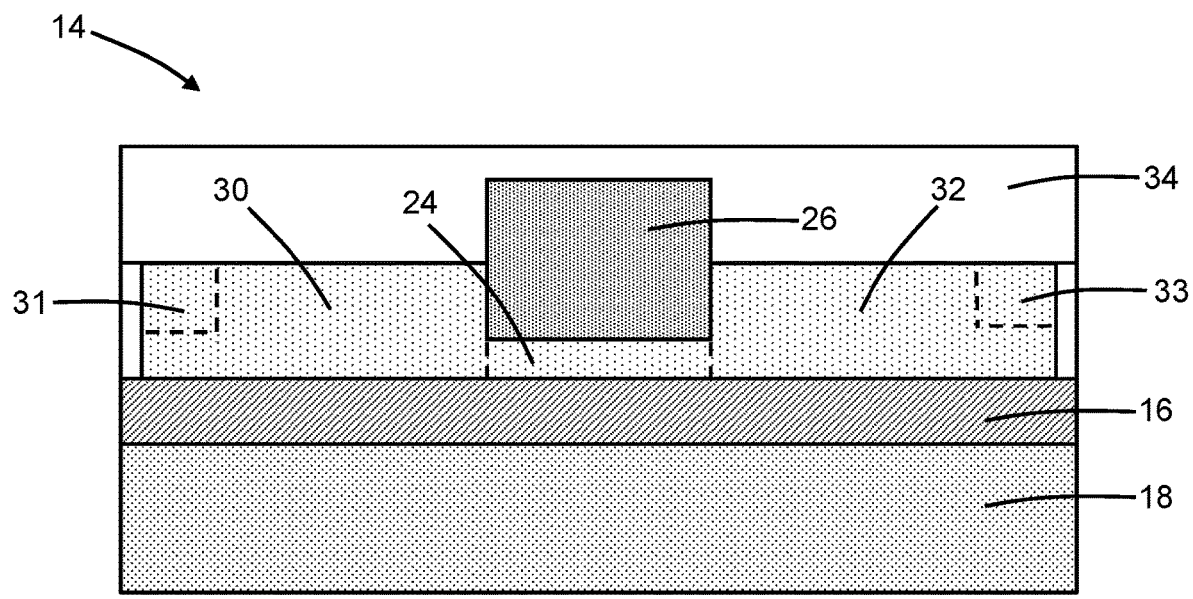
FIG. 6A is a cross-sectional view taken generally along line 6A-6A in FIG. 5.

With reference to FIGS. 5, 6, 6A in which like reference numerals refer to like features in FIGS. 3, 4, 4A and at a subsequent fabrication stage, a dielectric layer 34 is formed on the waveguide core 12 and the photodetector 14. In an embodiment, the dielectric layer 34 may be comprised of a dielectric material, such as silicon dioxide, that has a lower refractive index than the material of the waveguide core 12.

A waveguide core 36 may be formed on the dielectric layer 34 over the tapered section 20 of the waveguide core 12. In an embodiment, the waveguide core 36 may be comprised of a material having a refractive index that is greater than the refractive index of silicon dioxide. In an embodiment, the waveguide core 36 may be comprised of a dielectric material, such as silicon nitride, silicon oxynitride, or aluminum nitride. In an alternative embodiment, the waveguide core 36 may be comprised of a semiconductor material, such as polycrystalline silicon (i.e., polysilicon) or amorphous silicon. The waveguide core 36 may be patterned by depositing a layer of its constituent material, applying an etch mask, and etching the layer with an etching process, such as a reactive ion etching process.

In an embodiment, the material of the waveguide core 12 and the material of the waveguide core 36 may have equal refractive indices. For example, the waveguide core may be comprised of single-crystal silicon, and the waveguide core 36 may be comprised of polysilicon. In an embodiment, the material of the waveguide core 12 may have a larger refractive index than the material of the waveguide core 36. In an alternative embodiment, the material of the waveguide core 12 may have a smaller refractive index than the material of the waveguide core 36.

In an embodiment, the waveguide core 36 may be segmented into a plurality of segments 38 that are separated by gaps. One of the segments 38 is positioned adjacent to the side edge 25 of the pad 24 and the sidewall 85 of the semiconductor layer 26, and another of the segments 38 is spaced along the length of the waveguide core 36 to be most distant from the side edge 25 of the pad 24 and the sidewall 85 of the semiconductor layer 26. The tapered section 20 of the waveguide core 12 is positioned in elevation between the segments 38 of the waveguide core 36 and the semiconductor substrate 18.

The waveguide core 36 may have a section 40 in which the segments 38 are arranged with a non-curved arrangement that may be considered to be straight or linear. The segments 38 in the section 40 are positioned adjacent to the side edge 25 of the pad 24, and the segments 38 in the section 40 may be aligned along a longitudinal axis 41. In an embodiment, the segments 38 in the section 40 may overlap with the tapered section 20 of the waveguide core 12.

The waveguide core 36 may have a section 42 in which the segments 38 are positioned in a bend with a curved arrangement. The segments 38 in the section 40 are positioned between the segments 38 of the section 42 and the side edge 25 of the pad 24. The segments 38 in the section 42 extend across one of the sidewalls 19 of the tapered section 20. In an embodiment, one or more of the segments 38 in the section 42 may overlap with the tapered section 20 of the waveguide core 12, and one or more of the segments 38 in the section 42 may have a non-overlapping relationship with the tapered section 20 of the waveguide core 12.

In an embodiment, the pitch and duty cycle of the segments 38 may be uniform to define a periodic arrangement. In alternative embodiments, the pitch and/or the duty cycle of the segments 38 may be apodized (i.e., non-uniform) to define an aperiodic arrangement. The segments 38 may be dimensioned and positioned at small enough pitch so as to define a sub-wavelength grating that does not radiate or reflect light at a wavelength of operation. In an alternative embodiment, a longitudinally-extending rib, which may be tapered, may be overlaid on some or all of the segments 38 and bridge the corresponding gaps.

In an embodiment, the width dimension of the segments 38 may decrease with increasing distance from the side edge 25 of the pad 24 and the sidewall 85 of the semiconductor layer 26. In an embodiment, the width dimension of the segments 38 may decrease linearly with increasing distance from the side edge 25 and the sidewall 85. In an alternative embodiment, the width dimension of the segments 38 may vary based on a non-linear function, such as a quadratic function, a cubic function, a parabolic function, a sine function, a cosine function, a Bezier function, or an exponential function. In an embodiment, the width dimension of the segments 38 may be vary with a single stage of tapering characterized by a taper angle. In an alternative embodiment, the width dimension of the segments 38 may taper in multiple stages each characterized by a different taper angle. In an embodiment, the segments 38 may have a rectangular shape from a vertical perspective, an end perspective, and/or a side perspective, or a different shape (e.g., trapezoidal) from one or more perspectives.

Figure 7:
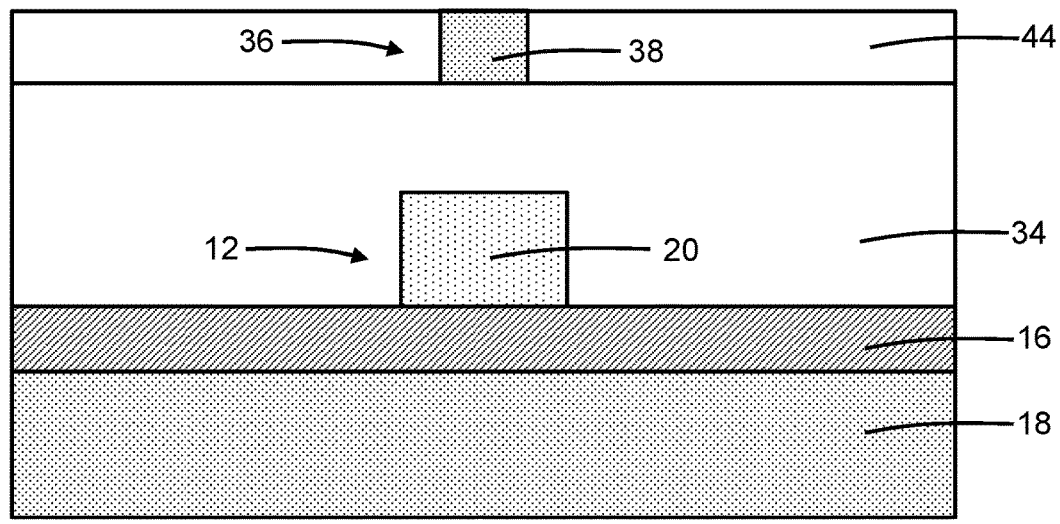
FIGS. 7, 7A are cross-sectional views of the structure at a fabrication stage subsequent to FIGS. 5, 6, 6A.
Figure 7A:
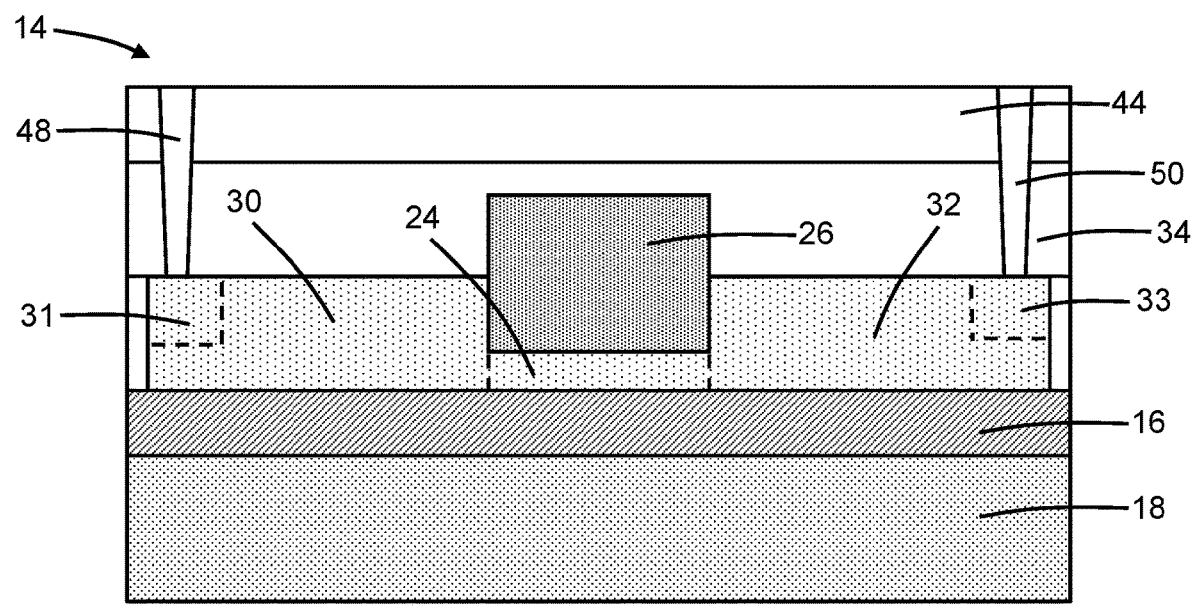

With reference to FIGS. 7, 7A in which like reference numerals refer to like features in FIGS. 5, 6, 6A and at a subsequent fabrication stage, a dielectric layer 44 is formed on the segments 38 and dielectric layer 34. In an embodiment, the dielectric layer 44 may be comprised of a dielectric material, such as silicon dioxide, that has a lower refractive index than the material of the waveguide core 36.

The dielectric material of the dielectric layer 44 is positioned in the gaps between adjacent pairs of the segments 38 such that a metamaterial structure may be defined in which the material constituting the segments 38 has a higher refractive index than the dielectric material of the dielectric layer 44. The metamaterial structure can be treated as a homogeneous material having an effective refractive index that is intermediate between the refractive index of the material constituting the segments 38 and the refractive index of the dielectric material constituting the dielectric layer 44.

Contacts 48 may be formed that land on the heavily-doped region 31, and contacts 50 may be formed that land on the heavily-doped region 33. The heavily-doped region 31 provides a reduced contact resistance and electrically couples the contacts 48 to the doped region 30. The heavily-doped region 33 provides a reduced contact resistance and electrically couples the contacts 50 to the doped region 32. The contacts 48, 50 may be comprised of a metal, such as tungsten. The doped regions 30, 32 may be biased through the contacts 48, 50.

In use, light (e.g., laser light) propagates in the waveguide core 12 toward the photodetector 14 and is coupled from the tapered section 20 of the waveguide core 12 to the semiconductor layer 26 of the photodetector 14. The waveguide core 12 may support propagation of light with transverse electric polarization mode, transverse magnetic polarization mode, or a combination of both. In an embodiment, the light may be modulated as an optical signal. The semiconductor layer 26 absorbs photons of the light and converts the absorbed photons into charge carriers. The biasing of the doped regions 30, 32 causes the charge carriers to be collected and output to provide, as a function of time, a measurable photocurrent.

The stacked combination of the tapered section 20 of the waveguide core 12 and the segments 38 of the waveguide core 36 may improve the efficiency of the light coupling to the semiconductor layer 26 of the photodetector 14. In particular, the coupling-assistance feature defined by the segments 38 of the waveguide core 36 may improve light absorption, responsivity, and/or reduce polarization dependent loss for light being transferred to the photodetector 14. The improvements may arise at least in part from the increase in the effective height of the tapered section 20 due to the addition of the segments 38 of the waveguide core 36 over the tapered section 20. The stacked combination may also reduce back reflection over a transition region from the tapered section 20 to the semiconductor layer 26 because, at least in part, to the segments 38 of the waveguide core 36 in the section 42 that are arranged in a bend with a curved arrangement.

Figure 8:
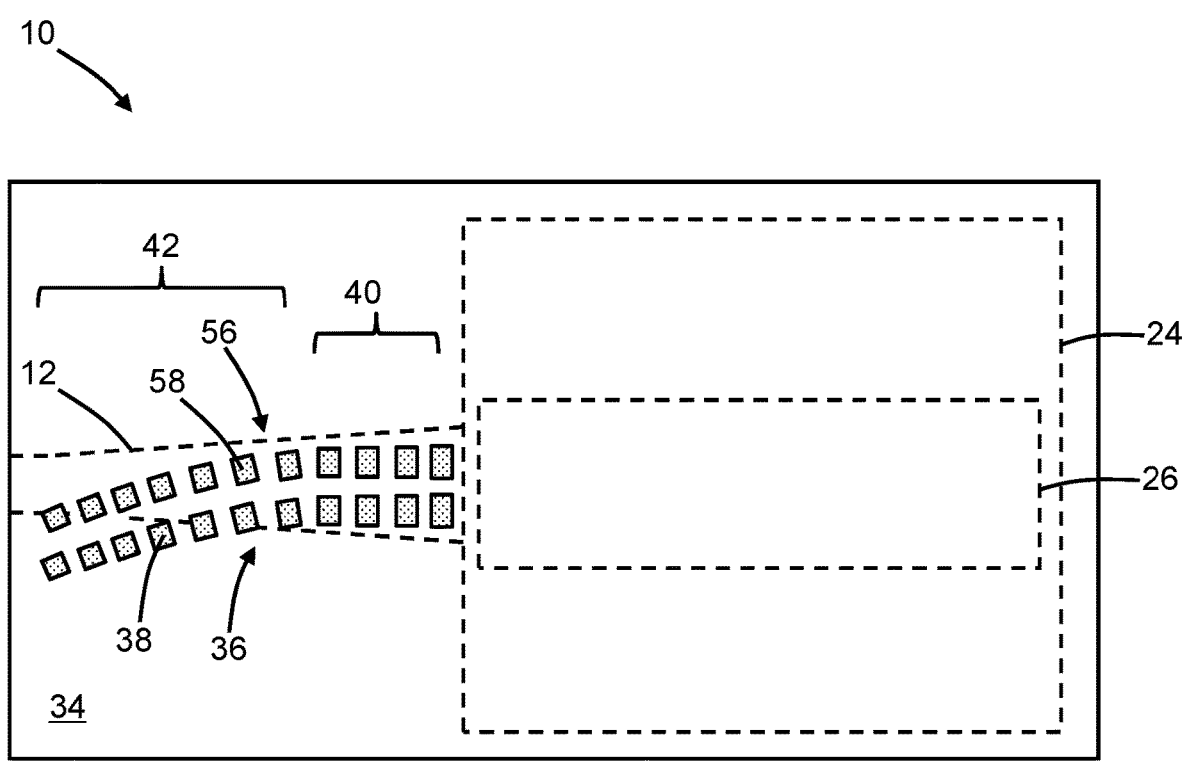
FIG. 8 is a top view of a structure in accordance with alternative embodiments of the invention.

With reference to FIG. 8 and in accordance with alternative embodiments, the structure 10 may be modified to add a waveguide core 56 that includes segments 58 positioned in a vertical direction over the tapered section 20 of the waveguide core 12. The segments 58 of the waveguide core 56 may be positioned adjacent to the segments 38 of the waveguide core 36, and the waveguide core 36 may be shifted laterally to accommodate the placement of the waveguide core 56. One of the segments 58 is positioned adjacent to the side edge 25 of the pad 24 and the sidewall 85 of the semiconductor layer 26, and another of the segments 58 is spaced along the length of the waveguide core 36 to be most distant from the side edge 25 of the pad 24 and the sidewall 85 of the semiconductor layer 26. The tapered section 20 of the waveguide core 12 is positioned in elevation between the segments 58 of the waveguide core 56 and the dielectric layer 16. The segments 58 may be grouped in the sections 40, 42 similar to the segments 38 of the waveguide core 36, and the segments 58 may be arranged adjacent to the sidewall 85 of the semiconductor layer 26 similar or identical to the arrangement of the segments 38 of the waveguide core 36 adjacent to the sidewall 85 of the semiconductor layer 26. In an embodiment, the waveguide core 56 may be comprised of the same material as the waveguide core 36.

The addition of the waveguide core 56 over the tapered section 20 of the waveguide core 12 as a coupling-assistance feature may strengthen the improvements provided by the waveguide core 36 alone.

Figure 9:
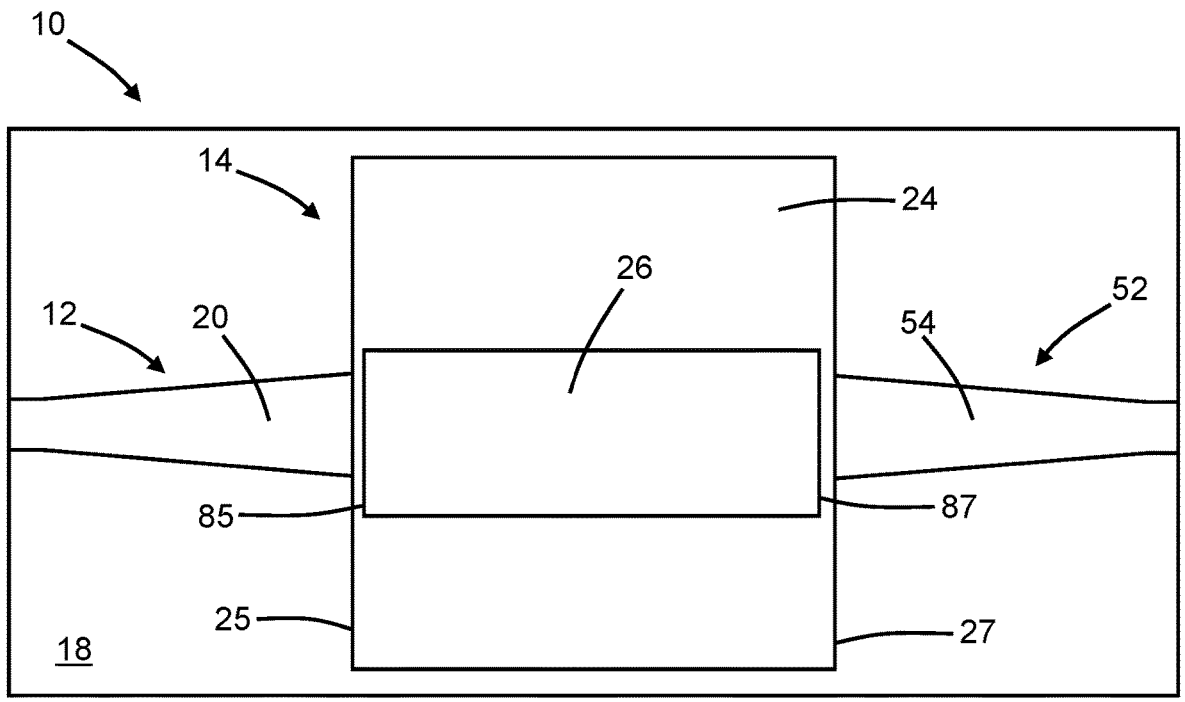
FIG. 9 is a top view of a structure at an initial fabrication stage of a processing method in accordance with alternative embodiments of the invention.

With reference to FIG. 9 and in accordance with alternative embodiments, a waveguide core 52 may include a tapered section 54 that is positioned adjacent to a side edge 27 of the pad 24 of the photodetector 14 that is opposite from the side edge 25 and positioned adjacent to a sidewall 87 of the semiconductor layer 26 that is opposite from the sidewall 85. The tapered section 54 of the waveguide core 52 may be similar or identical to the tapered section 20 of the waveguide core 12. In an embodiment, the waveguide core 52 may be comprised of the same material as the waveguide core 12.

The waveguide core 52 may supply another input to the photodetector 14 in addition to the input provided by the waveguide core 12. For example, the total power delivered to the photodetector 14 may be split between the input provided by the waveguide core 12 and the input provided by the waveguide core 52.

Figure 10:
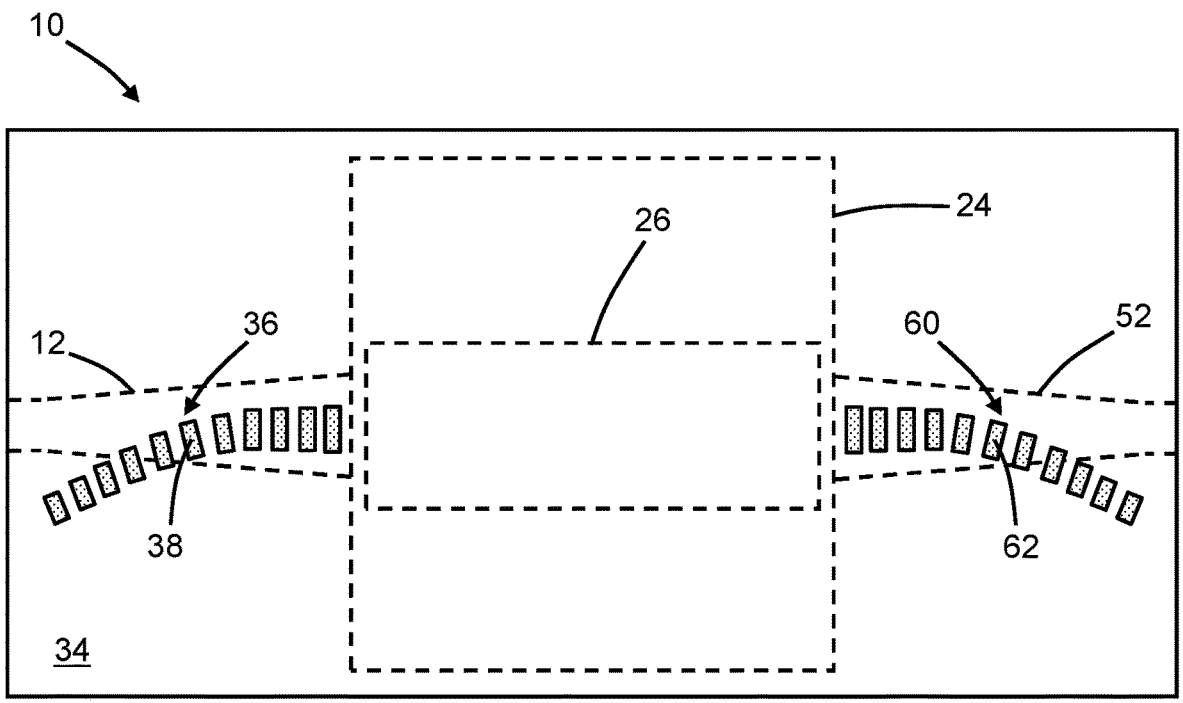
FIG. 10 is a top view of the structure at a fabrication stage subsequent to FIG. 9.

With reference to FIG. 10 in which like reference numerals refer to like features in FIG. 9 and at a subsequent fabrication stage, a waveguide core 60 may be formed on the dielectric layer 34 over the tapered section 54 of the waveguide core 52. The waveguide core 60 may be segmented into a plurality of segments 62 that are separated by gaps. One of the segments 62 is positioned adjacent to the side edge 27 of the pad 24 and the sidewall 87 of the semiconductor layer 26, and another of the segments 62 is spaced along the length of the waveguide core 36 to be most distant from the side edge 27 of the pad 24 and the sidewall 87 of the semiconductor layer 26. The tapered section 54 of the waveguide core 52 is positioned in elevation between the segments 62 of the waveguide core 60 and the dielectric layer 16. The segments 62 may be grouped in sections similar to the sections 40, 42 for the segments 38 of the waveguide core 36. The segments 62 may be arranged adjacent to the sidewall 87 of the semiconductor layer 26 similar or identical to the arrangement of the segments 38 of the waveguide core 36 adjacent to the sidewall 85 of the semiconductor layer 26. In an embodiment, the waveguide core 60 may be comprised of the same material as the waveguide core 36.

The addition of the waveguide core 60 over the tapered section 54 of the waveguide core 52 as a coupling-assistance feature may provides improvements analogous to the improvements provided by the waveguide core 36.

Figure 11:
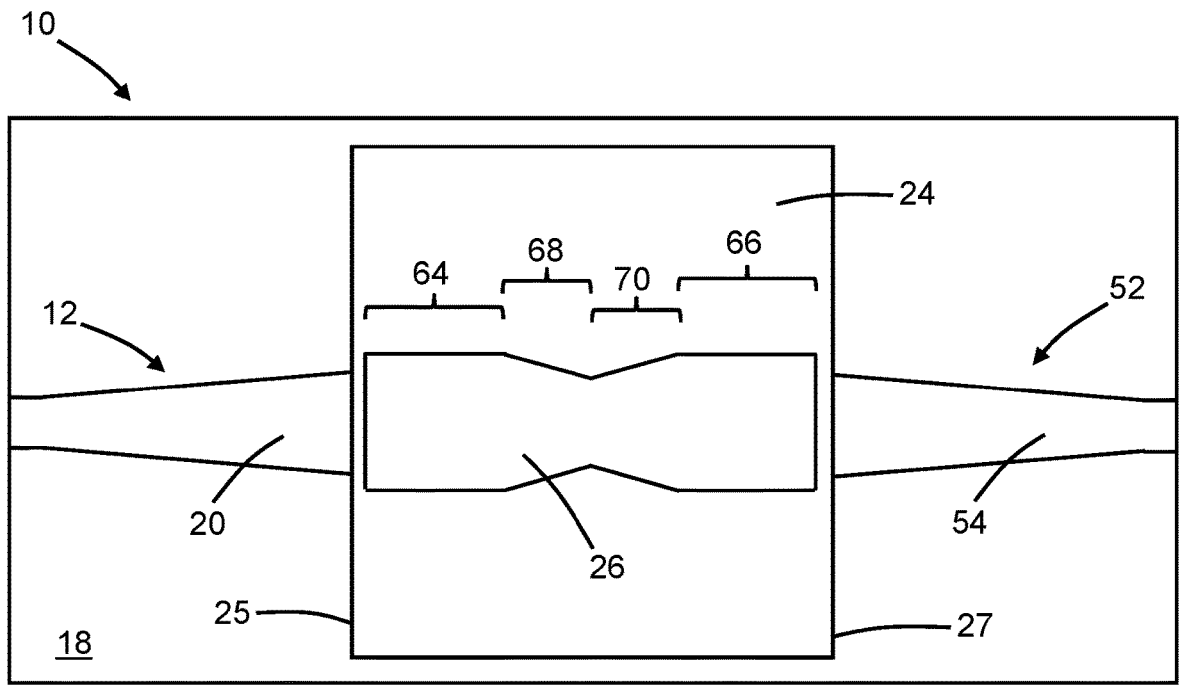
FIG. 11 is a top view of a structure at an initial fabrication stage of a processing method in accordance with alternative embodiments of the invention.

With reference to FIG. 11 and in accordance with alternative embodiments, the semiconductor layer 26 of the photodetector 14 may be modified to have a non-rectangular shape. In an embodiment, the semiconductor layer 26 may include a non-tapered section 64, a non-tapered section 66, and tapered sections 68, 70 that are arranged between the non-tapered section 64 and the non-tapered section 66. The tapered sections 68, 70 may be configured to taper in opposite directions and to adjoin at their respective narrow ends with the wide end of the tapered section 68 adjoining the non-tapered section 64 and the wide end of the tapered section 70 adjoining the non-tapered section 66. The tapered section 68 has a width dimension that decreases with decreasing distance from the tapered section 70, and the tapered section 70 has a width dimension that decreases with decreasing distance from the tapered section 68.

Figure 12:
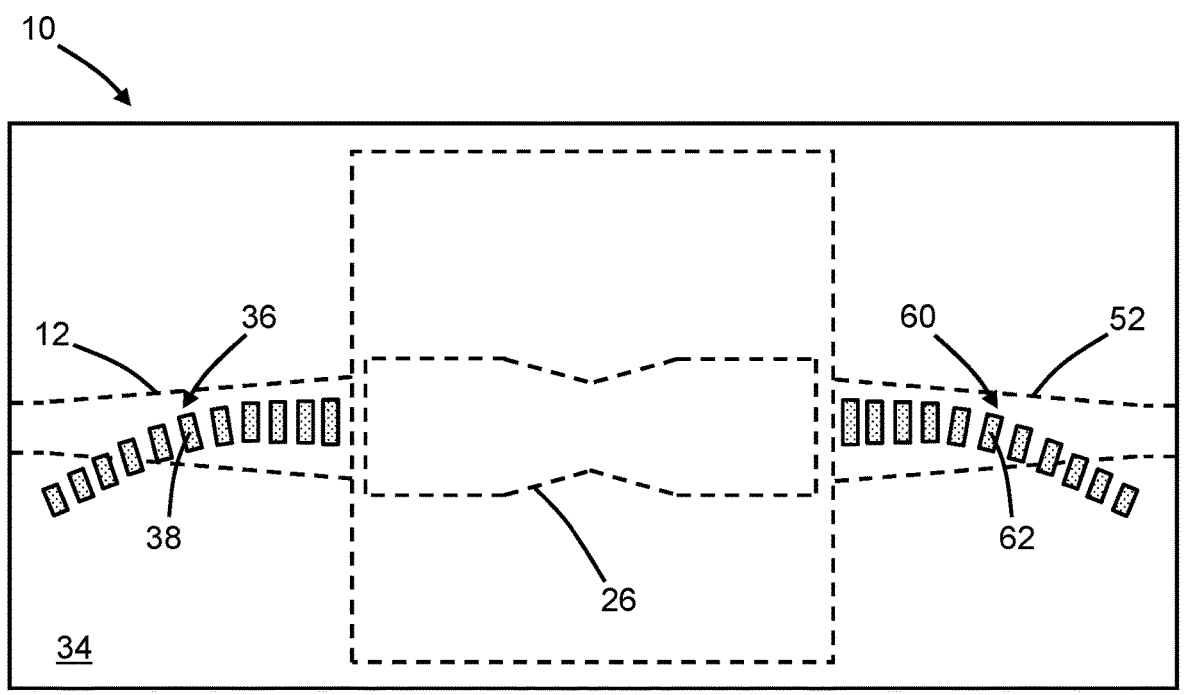
FIG. 12 is a top view of the structure at a fabrication stage subsequent to FIG. 11.

With reference to FIG. 12 in which like reference numerals refer to like features in FIG. 11 and at a subsequent fabrication stage, the waveguide core 36 may be formed as a coupling-assistance feature on the dielectric layer 34 over the tapered section 20 of the waveguide core 12, and the waveguide core 60 may be formed as a coupling-assistance feature on the dielectric layer 34 over the tapered section 54 of the waveguide core 52.

Figure 13:
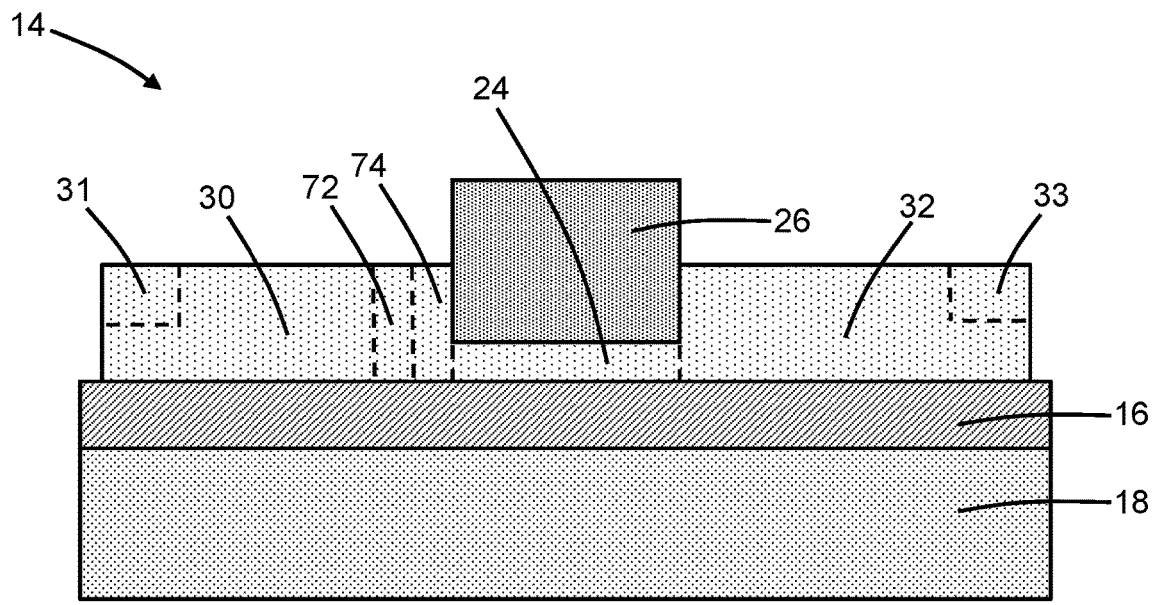
FIG. 13 is a cross-sectional view of a structure in accordance with alternative embodiments of the invention.

With reference to FIG. 13 and in accordance with alternative embodiments, the photodetector 14 may be configured as an avalanche photodetector that includes an intrinsic semiconductor region 72 in the pad 24 defining a multiplication region and a doped region 74 in the pad 24 defining a charge control region. The intrinsic semiconductor region 72 is positioned between the doped region 74 and the doped region 30, and the doped region 74 has an opposite conductivity type from the doped region 30. Incident radiation is absorbed in the absorption region defined by the semiconductor layer 26 and electron-hole pairs are generated, and signal amplification occurs in the multiplication region defined by the intrinsic semiconductor region 72. The charge control region provided by the doped region 74 may be effective to control the electric field in the multiplication and absorption regions. In use, an avalanche current is generated in the multiplication region by the creation of additional electron-hole pairs through impact ionization.

In an alternative embodiment, the avalanche photodetector may have a vertical arrangement instead of a lateral arrangement. Specifically, in the vertical arrangement, the doped region 30 may be arranged above the semiconductor layer 26, the intrinsic semiconductor region 72 may be arranged below the semiconductor layer 26, the doped region 74 may be arranged between the intrinsic semiconductor region 72 and the semiconductor layer 26, the doped region 32 may be laterally offset relative to the intrinsic semiconductor region 72 to permit contact landing.

Figure 14:
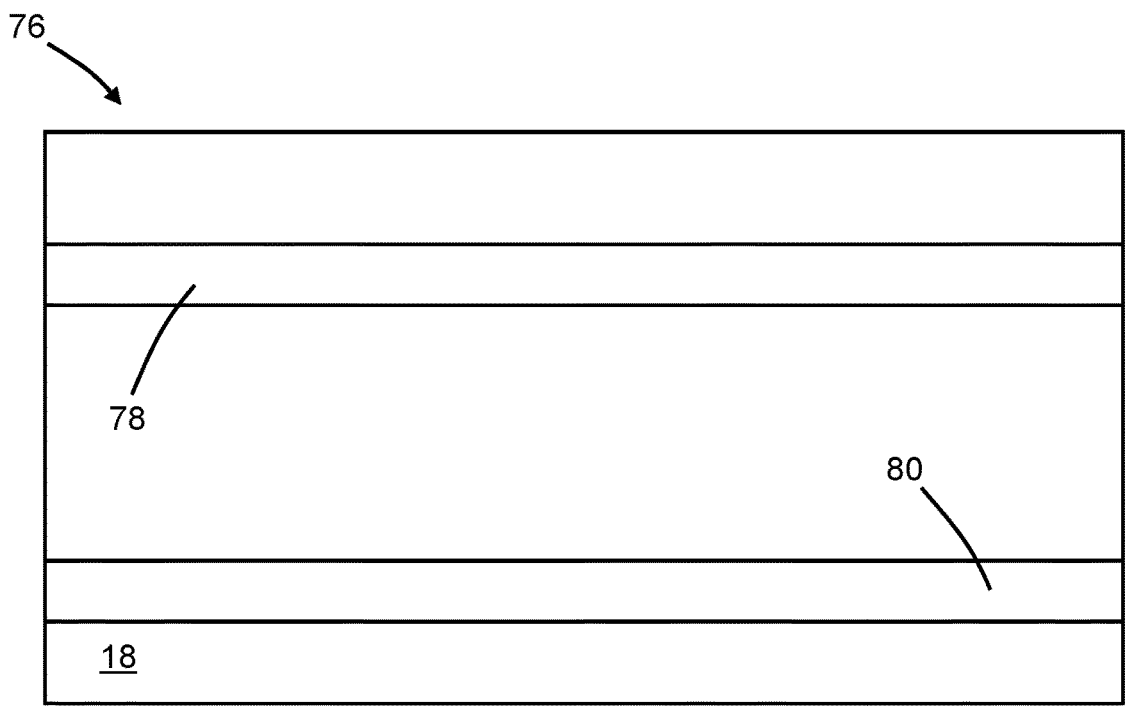
FIG. 14 is a top view of a structure in accordance with alternative embodiments of the invention.

With reference to FIG. 14 and in accordance with alternative embodiments, a structure 76 for a photonics chip may include a waveguide core 78 and a waveguide core 80 that are positioned on the dielectric layer 16. In an embodiment, the waveguide cores 78, 80 may be comprised of a material having a refractive index that is greater than the refractive index of silicon dioxide. In an embodiment, the waveguide cores 78, 80 may be comprised of a semiconductor material. In an embodiment, the waveguide cores 78, 80 may be comprised of single-crystal silicon. The waveguide cores 78, 80 may be formed by patterning a layer comprised of the constituent material with lithography and etching processes. In an embodiment, the waveguide cores 78, 80 may be concurrently formed by patterning the semiconductor material (e.g., single-crystal silicon) of a device layer of a silicon-on-insulator substrate. In an embodiment, the waveguide cores 78, 80 may be comprised of the same material. In an embodiment, the waveguide cores 78, 80 may be aligned parallel to each other.

Figure 15:
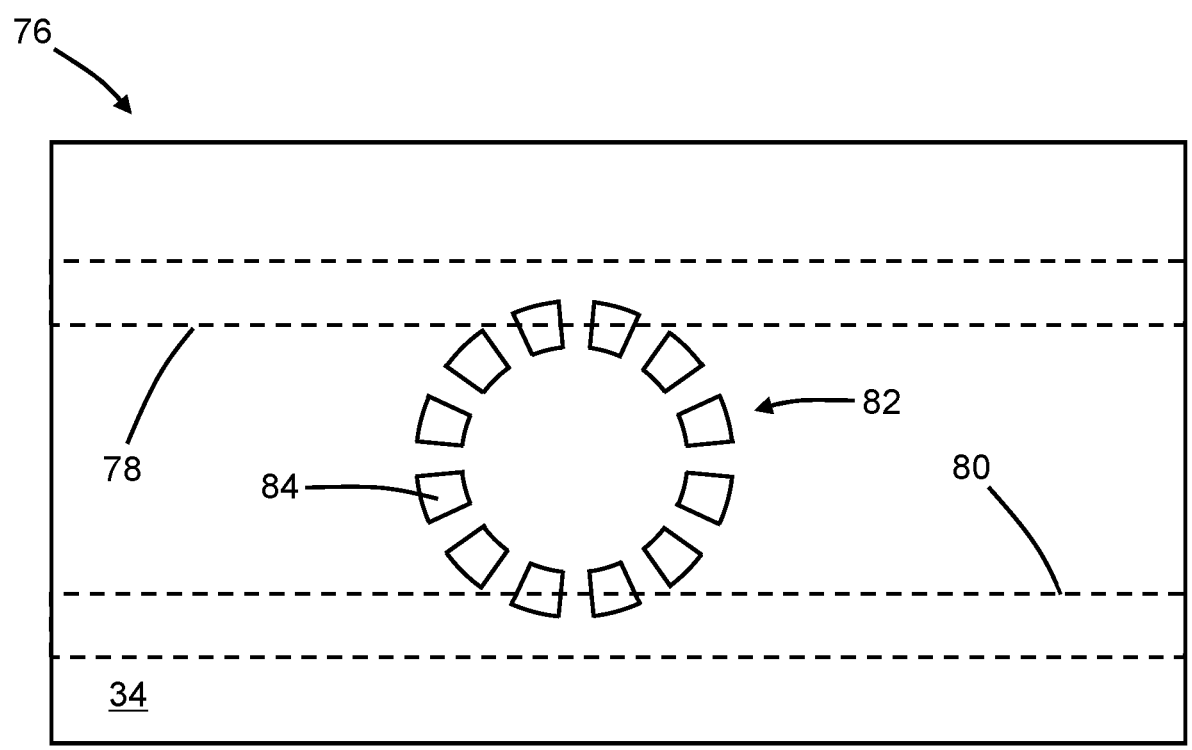
FIG. 15 is a top view of the structure at a fabrication stage subsequent to FIG. 14.

With reference to FIG. 15 in which like reference numerals refer to like features in FIG. 14 and at a subsequent fabrication stage, the dielectric layer 34 may be formed over the waveguide cores 78, 80, and a ring resonator 82 may be formed on the dielectric layer 34. In an embodiment, the waveguide core 78 may provide an input bus to the ring resonator 82, and the waveguide core 80 may provide an output bus from the ring resonator 82. The ring resonator 82 may be segmented into a plurality of segments 84 that are circumferentially arranged and that are separated by gaps. At least one of the segments 84 overlaps with a portion of the waveguide core 78, and at least one of the segments 84 overlaps with a portion of the waveguide core 80. The segments 84 that contribute to the respective overlapped portions of the waveguide cores 78, 80 may be diametrically positioned.

In an embodiment, the ring resonator 82 may be comprised of a material having a refractive index that is greater than the refractive index of silicon dioxide. In an embodiment, the ring resonator 82 may be comprised of a material that differs from the material of the waveguide cores 78, 80. In an embodiment, the ring resonator 82 may be comprised of a dielectric material, such as silicon nitride, that is deposited and patterned by lithography and etching processes. In alternative embodiments, the ring resonator 82 may be comprised of a different dielectric material, such as silicon oxynitride. In alternative embodiments, the ring resonator 82 may be comprised of a non-dielectric material, such as a III-V compound semiconductor material.

In use, light (e.g., laser light) may be coupled and transferred in an upward direction from the overlapped portion of the waveguide core 78 to the ring resonator 82. The light propagates in the ring resonator 82 and is subsequently coupled and transferred in a downward direction from the ring resonator 82 to the overlapped portion of the waveguide core 80. The result is light transfer from the waveguide core 78 to the waveguide core 80 that is mediated by the ring resonator 82.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure comprising:
   a photodetector including a pad and a semiconductor layer positioned on the pad, the semiconductor layer having a first sidewall, and the pad including a first side edge;
   a first waveguide core including a tapered section adjacent to the first sidewall of the semiconductor layer, the tapered section terminating at the first side edge of the pad; and
   a second waveguide core including a curved section and a non-curved section adjacent to the first sidewall of the semiconductor layer and the first side edge of the pad, the curved section including a first plurality of segments and the non-curved section including a second plurality of segments positioned between the first plurality of segments and the first side edge of the pad,
   wherein the tapered section of the first waveguide core is overlapped by at least one of the first plurality of segments in the curved section of the second waveguide core, and the tapered section of the first waveguide core is overlapped by the second plurality of segments in the non-curved section of the second waveguide core.

2. The structure of claim 1 wherein the curved section is terminated by one of the first plurality of segments.

3. The structure of claim 1 wherein the tapered section has a first width dimension that increases with decreasing distance from the first sidewall of the semiconductor layer.

4. The structure of claim 1 wherein at least one of the first plurality of segments in the curved section of the second waveguide core has a non-overlapping relationship with the tapered section of the first waveguide core.

5. The structure of claim 1 wherein the first waveguide core and the pad comprise single-crystal silicon, the second waveguide core comprises polysilicon or silicon nitride, and the semiconductor layer comprises germanium.

6. The structure of claim 1 wherein the first waveguide core and the pad comprise a first material, and the second waveguide core comprises a second material different than the first material.

7. The structure of claim 1 wherein the tapered section of the first waveguide core has a longitudinal axis, and the curved section of the second waveguide core curves laterally away from the longitudinal axis.

8. The structure of claim 1 wherein the tapered section of the first waveguide core has a first sidewall, and the curved section of the second waveguide core extends across the first sidewall of the tapered section of the first waveguide core.

9. The structure of claim 8 wherein at least one of the first plurality of segments in the curved section of the second waveguide core has a non-overlapping relationship with the tapered section of the first waveguide core.

10. The structure of claim 1 further comprising:
    a third waveguide core including a curved section adjacent to the semiconductor layer and the first sidewall of the semiconductor layer, the third waveguide core including a plurality of segments adjacent to the curved section of the second waveguide core,
    wherein the tapered section of the first waveguide core is overlapped by at least one of the plurality of segments in the curved section of the third waveguide core.

11. The structure of claim 1 wherein the semiconductor layer has a second sidewall opposite from the first sidewall, and further comprising:
    a third waveguide core including a tapered section positioned adjacent to the second sidewall of the semiconductor layer; and
    a fourth waveguide core including a curved section adjacent to the second sidewall of the semiconductor layer, the curved section including a plurality of segments,
    wherein the tapered section of the third waveguide core is overlapped by at least one of the plurality of segments in the curved section of the fourth waveguide core.

12. The structure of claim 11 wherein the semiconductor layer is positioned between the tapered section of the first waveguide core and the tapered section of the third waveguide core.

13. The structure of claim 1 wherein the semiconductor layer includes a first tapered section and a second tapered section that adjoins the first tapered section.

14. The structure of claim 13 wherein the first tapered section of the semiconductor layer has a first width dimension that decreases with decreasing distance from the second tapered section of the semiconductor layer, and the second tapered section of the semiconductor layer has a second width dimension that decreases with decreasing distance from the first tapered section of the semiconductor layer.

15. The structure of claim 1 wherein the semiconductor layer is positioned on a portion of the pad comprising an intrinsic semiconductor material, and further comprising:
    a first doped region in the pad, the first doped region having a first conductivity type; and
    a second doped region in the pad, the second doped region having a second conductivity type opposite to the first conductivity type,
    wherein the portion of the pad is positioned in a lateral direction between the first doped region and the second doped region.

16. A structure comprising:
    a first waveguide core;
    a second waveguide core adjacent to the first waveguide core; and
    a ring resonator including a plurality of segments, at least one of the plurality of segments overlapped with a portion of the first waveguide core, and at least one of the plurality of segments overlapped with a portion of the second waveguide core.

17. A method comprising:
    forming a photodetector including a pad and a semiconductor layer on the pad, wherein the semiconductor layer includes a sidewall, and the pad includes a side edge;
    forming a first waveguide core including a tapered section adjacent to the sidewall of the semiconductor layer, wherein the tapered section terminates at the side edge of the pad; and forming a second waveguide core including a curved section and a non-curved section adjacent to the sidewall of the semiconductor layer and the side edge of the pad, wherein the curved section includes a first plurality of segments and the non-curved section including a second plurality of segments positioned between the first plurality of segments and the side edge of the pad, the tapered section of the first waveguide core is overlapped by at least one of the first plurality of segments in the curved section of the second waveguide core, and the tapered section of the first waveguide core is overlapped by the second plurality of segments in the non-curved section of the second waveguide core.

18. The structure of claim 1 further comprising:
a semiconductor substrate; and
a dielectric layer between the tapered section of the first waveguide core and the semiconductor substrate.

19. The structure of claim 18 wherein the tapered section of the first waveguide core is positioned in elevation between the first plurality of segments of the first waveguide core and the semiconductor substrate.

20. The structure of claim 8 wherein the tapered section of the first waveguide core has a second sidewall, and the first sidewall and the second sidewall intersect the first side edge of the pad.

* * * * *